US012419464B1

United States Patent
Li et al.

(10) Patent No.: US 12,419,464 B1
(45) Date of Patent: Sep. 23, 2025

(54) LIFTING MECHANISM FOR FOOD PROCESSOR

(71) Applicant: Guangdong Link Plus Technology Group Co., Ltd., Guangdong (CN)

(72) Inventors: Long Li, Foshan (CN); Chunlong Li, Foshan (CN); Junqiang He, Foshan (CN); Feng Xue, Foshan (CN); Huasheng Lai, Foshan (CN); Dan Zhu, Foshan (CN)

(73) Assignee: Guangdong Link Plus Technology Group Co., Ltd., Foshan (CN)

( * ) Notice: Subject to any disclaimer, the term of this patent is extended or adjusted under 35 U.S.C. 154(b) by 0 days.

(21) Appl. No.: 19/220,452

(22) Filed: May 28, 2025

(30) Foreign Application Priority Data

Mar. 14, 2025 (CN) .......................... 202510303869.1
Mar. 31, 2025 (CN) .......................... 202520587371.8

(51) Int. Cl.
*A47J 43/00* (2006.01)
*A47J 43/044* (2006.01)
*A47J 43/08* (2006.01)

(52) U.S. Cl.
CPC ........... *A47J 43/044* (2013.01); *A47J 43/082* (2013.01); *A47J 2043/04472* (2013.01); *A47J 2043/0449* (2013.01)

(58) Field of Classification Search
CPC ............ A47J 43/044; A47J 2043/04481; A47J 2043/04472; A47J 2043/0449; A47J 43/082
See application file for complete search history.

(56) References Cited

U.S. PATENT DOCUMENTS

| 1,418,099 | A  | * | 5/1922 | Sigal   | A47J 43/044 185/39 |
| 2,738,959 | A  | * | 3/1956 | Schott  | A47J 43/044 279/155 |
| 11,882,965 | B1 | * | 1/2024 | Chu     | B01F 31/40 |
| 2011/0048246 | A1 | * | 3/2011 | Chang   | F24C 15/322 99/348 |
| 2016/0220069 | A1 | * | 8/2016 | Gardner | A47J 43/044 |
| 2023/0000290 | A1 | * | 1/2023 | Chupka  | A47J 43/044 |
| 2023/0190043 | A1 | * | 6/2023 | Kim     | B01F 27/808 241/282.1 |

* cited by examiner

*Primary Examiner* — Anshu Bhatia
(74) *Attorney, Agent, or Firm* — Wang Law Firm, Inc.

(57) ABSTRACT

The present invention relates to the field of food processing equipment, and more specifically to a lifting mechanism for a food processor. The mechanism comprises a mounting platform; a cutter shaft rotatable and axially movable relative to the platform; a drive sleeve with an internal threaded structure; an external threaded structure on the cutter shaft in threaded engagement with the drive sleeve; and a driving module configured to rotate the cutter shaft. When a rotational speed difference exists between the drive sleeve and the cutter shaft, the threaded engagement causes axial movement of the cutter shaft. This design employs a single driving module to achieve both rotation and lifting, thereby reducing structural complexity and manufacturing costs.

10 Claims, 13 Drawing Sheets

LIFTING MECHANISM FOR FOOD PROCESSOR

FIELD OF INVENTION

The present invention relates to the field of food processing equipment, and more particularly to a lifting mechanism for a food processor.

BACKGROUND OF THE INVENTION

In the prior art, as exemplified by Chinese Utility Model Patent Publication No. CN216674577U, a micro fruit puree machine is disclosed. The micro fruit puree machine includes a housing, a platform, a positioning motor, and a drive motor. The platform is movably positioned within the housing between a first position and a second position. The positioning motor is mounted on the housing and is mechanically coupled to the platform, such that the positioning motor is configured to drive the platform between the first position and the second position. The drive motor is configured to rotate a power shaft relative to the platform. The drive motor is mounted on the platform, such that the drive motor and the power shaft move in unison with the platform between the first and second positions in response to actuation of the positioning motor.

However, the foregoing dual-motor configuration requires separate motors to achieve axial displacement and rotational actuation of the power shaft, thereby increasing the structural complexity and manufacturing costs of the food processor. Accordingly, there remains a need in the art for a lifting mechanism that achieves the desired functions using a simplified structure with reduced component count and cost.

SUMMARY OF THE INVENTION

The present invention is directed to addressing at least one of the technical deficiencies identified in the prior art. To this end, the present invention provides a lifting mechanism for a food processor that utilizes a single driving module to achieve both axial movement and rotational actuation of a cutter shaft.

A lifting mechanism for a food processor, as disclosed herein, comprises:
- a mounting platform;
- a cutter shaft, wherein the cutter shaft is rotatably mounted relative to the mounting platform and is further configured to move along an axial direction of the cutter shaft relative to the mounting platform;
- a drive sleeve, wherein an installation bore is defined within the drive sleeve, an internal threaded structure is formed within the installation bore, and the cutter shaft is provided with an external threaded structure, the internal threaded structure being in threaded engagement with the external threaded structure; and
- a driving module, wherein the driving module is operatively coupled to the cutter shaft and is configured to drive the cutter shaft to rotate relative to the mounting platform;
- wherein, when a rotational speed differential exists between the drive sleeve and the cutter shaft, the external threaded structure cooperates with the internal threaded structure to drive the cutter shaft to move along its axial direction.

In some embodiments, the drive sleeve is rotatably mounted relative to the mounting platform, and the lifting mechanism further comprises a speed differential module that applies a constraining force to the drive sleeve such that a rotational speed differential is established between the drive sleeve and the cutter shaft.

In alternative embodiments, the drive sleeve is fixedly mounted to the mounting platform.

In some embodiments, the internal threaded structure comprises a threaded groove formed within the installation bore, and the external threaded structure comprises a drive nut disposed on the cutter shaft, wherein the drive nut is threadably engaged with the threaded groove.

In certain embodiments, the cutter shaft is detachably coupled to the drive nut.

In further embodiments, the drive nut defines a spline socket, and the cutter shaft comprises a coupling shaft that is movably inserted into the spline socket. The drive nut further comprises a quick-release mechanism configured to retain the coupling shaft within the spline socket.

In one embodiment, the quick-release mechanism comprises a detent groove formed on the coupling shaft. The drive nut defines a radial bore in communication with the detent groove, and a detent ball is movably disposed within the radial bore and is configured to engage the detent groove. A locking collar is sleeved around an exterior of the drive nut and is configured to move relative to the drive nut. The locking collar comprises a locking shoulder, which abuts the detent ball so as to constrain the detent ball within the detent groove.

In some embodiments, the quick-release mechanism further comprises a locking spring configured to exert a biasing force on the locking collar to maintain the locking collar in a locked position in which the locking shoulder abuts the detent ball. The drive sleeve is movably provided with a release actuator, and the release actuator comprises an actuator tab configured to abut the locking collar and push the locking collar from the locked position to an unlocked position.

In one embodiment, the speed differential module comprises a stator magnetic pole fixedly mounted within the food processor. A rotor is rotatably disposed within the stator magnetic pole, and a coil is arranged within the stator magnetic pole. The drive sleeve comprises a drive coupling that is fixedly coupled to the rotor.

In another embodiment, the speed differential module comprises a brake shoe and an actuation lever. The brake shoe is rotatably or movably arranged relative to the mounting platform and is configured such that, upon rotation or movement relative to the mounting platform, the brake shoe incrementally engages or disengages the drive sleeve. The actuation lever is configured to actuate the brake shoe to rotate or move relative to the mounting platform.

Compared with the prior art, the present invention employs a single driving module to effect both rotation and axial translation of the cutter shaft. Through the threaded engagement between the internal threaded structure and the external threaded structure, a rotational speed differential between the drive sleeve and the cutter shaft causes the external threaded structure to cooperate with the internal threaded structure to axially displace the cutter shaft. The present invention thereby simplifies the drive architecture, reduces component complexity and manufacturing costs, and enhances overall structural integration. Furthermore, by enabling the cutter shaft to extend into the drive sleeve and employ threaded transmission, the invention obviates the

DETAILED DESCRIPTION OF THE PREFERRED EMBODIMENTS

Figure 1:
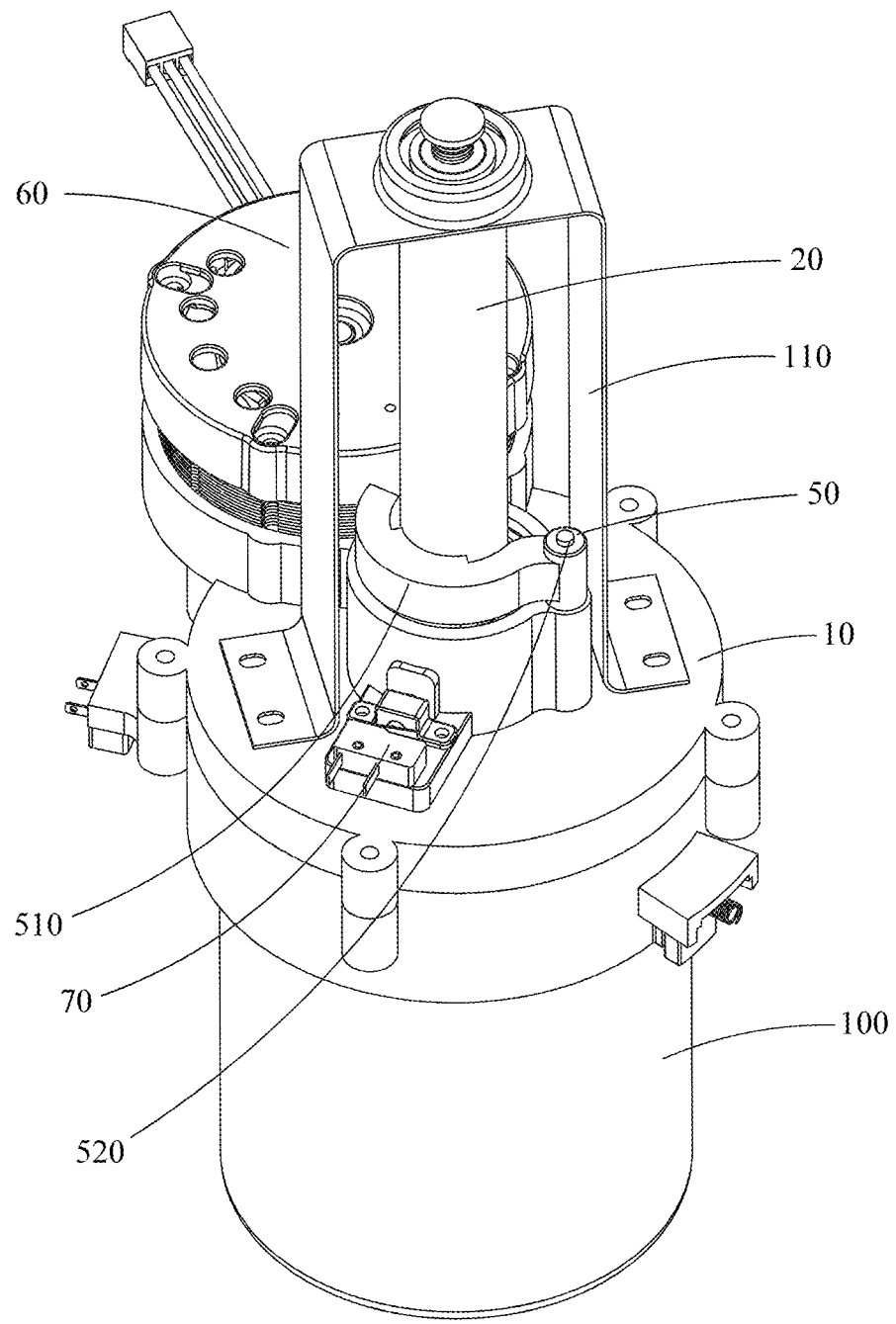
FIG. 1 is a perspective view of the present invention.

The following detailed description illustrates one or more embodiments of the present invention with reference to the accompanying drawings. These embodiments are provided solely to enhance the understanding of the technical solutions disclosed herein and are not intended to limit the scope of protection of the invention in any way.

Unless otherwise defined, all technical and scientific terms used herein shall have the same meanings as commonly understood by those of ordinary skill in the technical field to which this invention pertains. The terminology employed throughout this disclosure, including the claims and the accompanying drawings, such as the terms "comprising" and "having," and their grammatical variants, are intended to express non-exclusive inclusion.

In the context of the embodiments described herein, ordinal terms such as "first," "second," and the like are used solely to distinguish between elements of the same category and should not be construed as implying any priority, quantity, order, or hierarchical structure unless otherwise explicitly stated.

The term "an embodiment," as used herein, indicates that a particular feature, structure, or characteristic described in connection with the embodiment is included in at least one implementation of the present invention. The occurrence of such a phrase in multiple places throughout this specification does not necessarily refer to the same embodiment, nor does it imply mutual exclusivity among embodiments. It will be readily understood by those skilled in the art that individual features described in connection with distinct embodiments may be combined in any suitable manner.

As used herein, the term "and/or" denotes an inclusive relationship among the associated items. For example, the expression "A and/or B" encompasses three possibilities: only A, only B, and both A and B. Additionally, the symbol "/" generally indicates a logical "or" relationship among the connected elements.

The term "plurality," as used in this disclosure, refers to two or more of the referenced items (including two). Similarly, the terms "multiple groups" and "multiple pieces" shall be interpreted as indicating two or more groups or pieces, respectively.

Positional and directional terms such as "center," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial," and "circumferential" are used with reference to the orientation depicted in the drawings and are intended solely for the purpose of facilitating the description of the embodiments. These terms should not be construed as limiting the invention to any particular orientation or method of use, unless expressly specified.

Furthermore, terms such as "mounted," "connected," "coupled," and "fixed," unless explicitly limited otherwise, are to be interpreted in a broad sense. For example, a connection may be a fixed connection, a detachable connection, an integrally formed connection, a mechanical or electrical connection, a direct or indirect connection via an intermediate component, or an internal communication between or interaction among elements. Those skilled in the art will be able to interpret such relationships in accordance with the technical context of the described embodiments.

As shown in FIGS. 1 through 10, a food processor comprises:
- a mounting platform 10;
- a processing bowl 100 defining a processing chamber 101;
- a cutter shaft 30, wherein the cutter shaft 30 is rotatably mounted relative to the mounting platform 10 and is further arranged to move along an axial direction of the cutter shaft 30, with at least a portion of the cutter shaft 30 extending into the processing chamber 101;
- a cutter 310, wherein the cutter 310 is connected to the cutter shaft 30;
- a drive sleeve 20, wherein the drive sleeve 20 defines an installation bore 200 in which an internal threaded structure 210 is disposed, and wherein the cutter shaft 30 is provided with an external threaded structure 40 that is threadably engaged with the internal threaded structure 210; and
- a driving module 60, wherein the driving module 60 is operatively coupled to the cutter shaft 30 to drive rotation of the cutter shaft 30 relative to the mounting platform 10;
- when a rotational speed differential exists between the drive sleeve 20 and the cutter shaft 30, the external threaded structure 40 cooperates with the internal threaded structure 210 to drive axial displacement of the cutter shaft 30.

In a first embodiment of the connection between the drive sleeve 20 and the mounting platform 10, the drive sleeve 20 is fixedly secured to the mounting platform 10. In this configuration, rotation of the cutter shaft 30 relative to the mounting platform 10 results in a rotational speed differential between the cutter shaft 30 and the stationary drive sleeve 20. As a result, the threaded engagement between the external threaded structure 40 and the internal threaded structure 210 converts the rotational motion of the cutter shaft 30 into axial movement thereof.

In a second embodiment of the connection between the drive sleeve 20 and the mounting platform 10, the drive sleeve 20 is rotatably mounted to the mounting platform 10. A speed differential module 50 is provided to apply a constraining force to the drive sleeve 20, thereby creating a controlled rotational speed differential between the drive sleeve 20 and the cutter shaft 30.

During operation, food material to be processed is placed into the processing chamber 101 of the processing bowl 100. The processing bowl 100 is assembled and fixed to the food processor such that the processing bowl 100 remains stationary relative to the mounting platform 10. Upon activation of the driving module 60, the cutter shaft 30 is driven to rotate, thereby actuating the cutter 310 to perform a shearing and stirring operation. Whether the cutter shaft 30 undergoes axial movement during this process is determined by the operational state of the speed differential module 50. When no constraining force is applied to the drive sleeve 20, the drive sleeve 20 rotates synchronously with the cutter shaft 30, and no rotational speed differential exists between them. Under this condition, the cutter shaft 30 remains stationary in the axial direction relative to the drive sleeve 20, and the cutter 310 maintains a fixed cutting position. Conversely, when the speed differential module 50 imposes a constraining force on the drive sleeve 20, a rotational speed differential is generated between the drive sleeve 20 and the cutter shaft 30. This speed differential causes the external threaded structure 40 to cooperate with the internal threaded structure 210, resulting in simultaneous rotation and axial displacement of the cutter shaft 30 relative to the drive sleeve 20. The magnitude of axial displacement is positively correlated with the magnitude of the rotational speed differential. This enables intelligent adjustment of the cutter shaft's axial position based on varying processing requirements, thereby enhancing the effectiveness and adaptability of the cutting operation.

As shown in FIG. 1, the mounting platform 10 is provided with a support bracket 110. One end of the drive sleeve 20 is rotatably connected to the mounting platform 10, while an opposite end of the drive sleeve 20 is rotatably connected to the support bracket 110.

Figure 3:
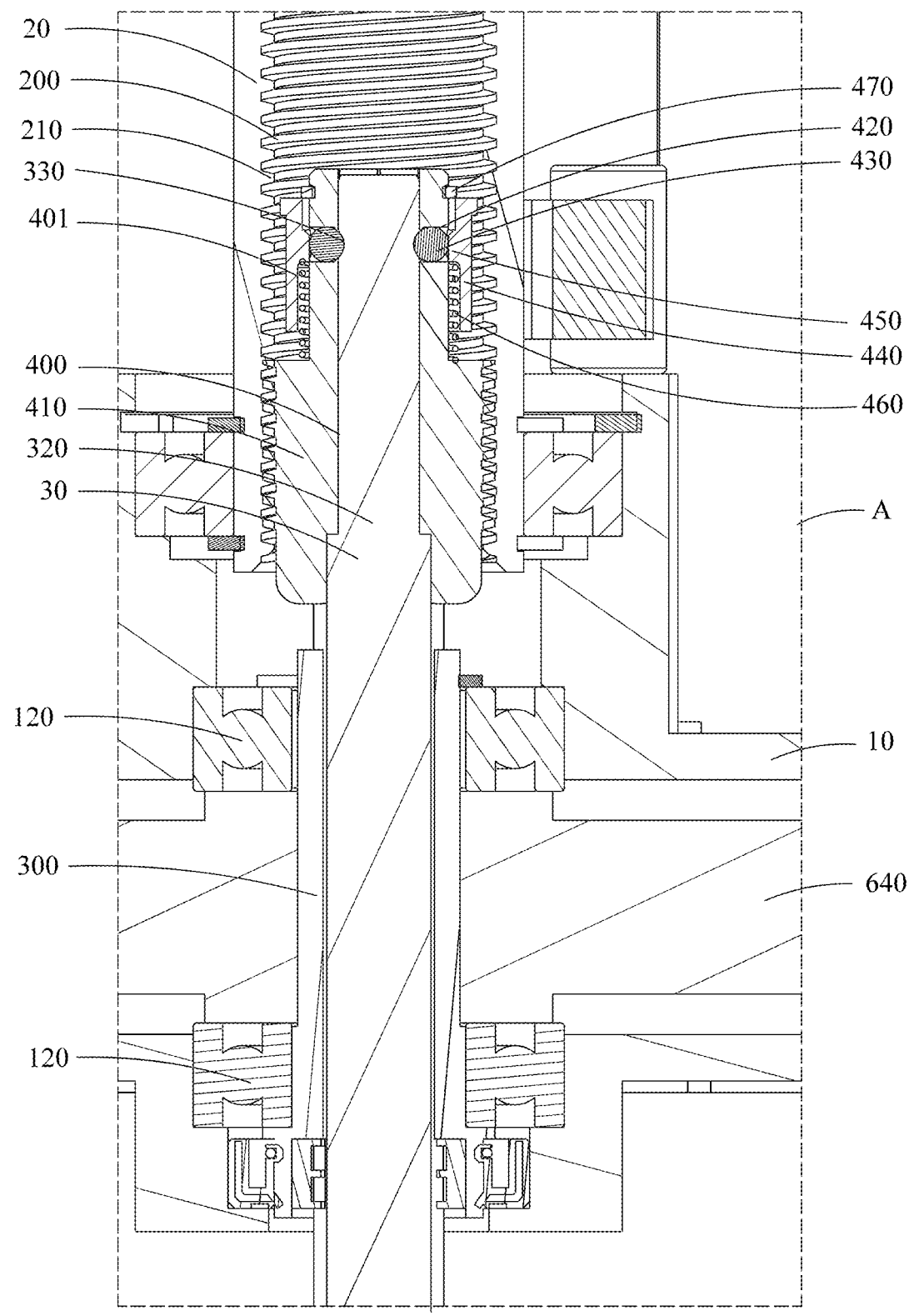
FIG. 3 is an enlarged view of part A in FIG. 2.

As shown in FIG. 3, the mounting platform 10 is rotatably fitted with a shaft sleeve 300. The cutter shaft 30 is axially movably arranged within the shaft sleeve 300 and is configured to rotate synchronously therewith. The shaft sleeve 300 is implemented as a splined sleeve, and the cutter shaft 30 is configured as a splined shaft. The spline engagement between the shaft sleeve 300 and the cutter shaft 30 ensures synchronous rotation while permitting relative axial displacement. As illustrated in FIG. 3, the shaft sleeve 300 is mounted on the mounting platform 10 via a plurality of bearings 120, which are selected and arranged based on specific assembly requirements.

Figure 2:
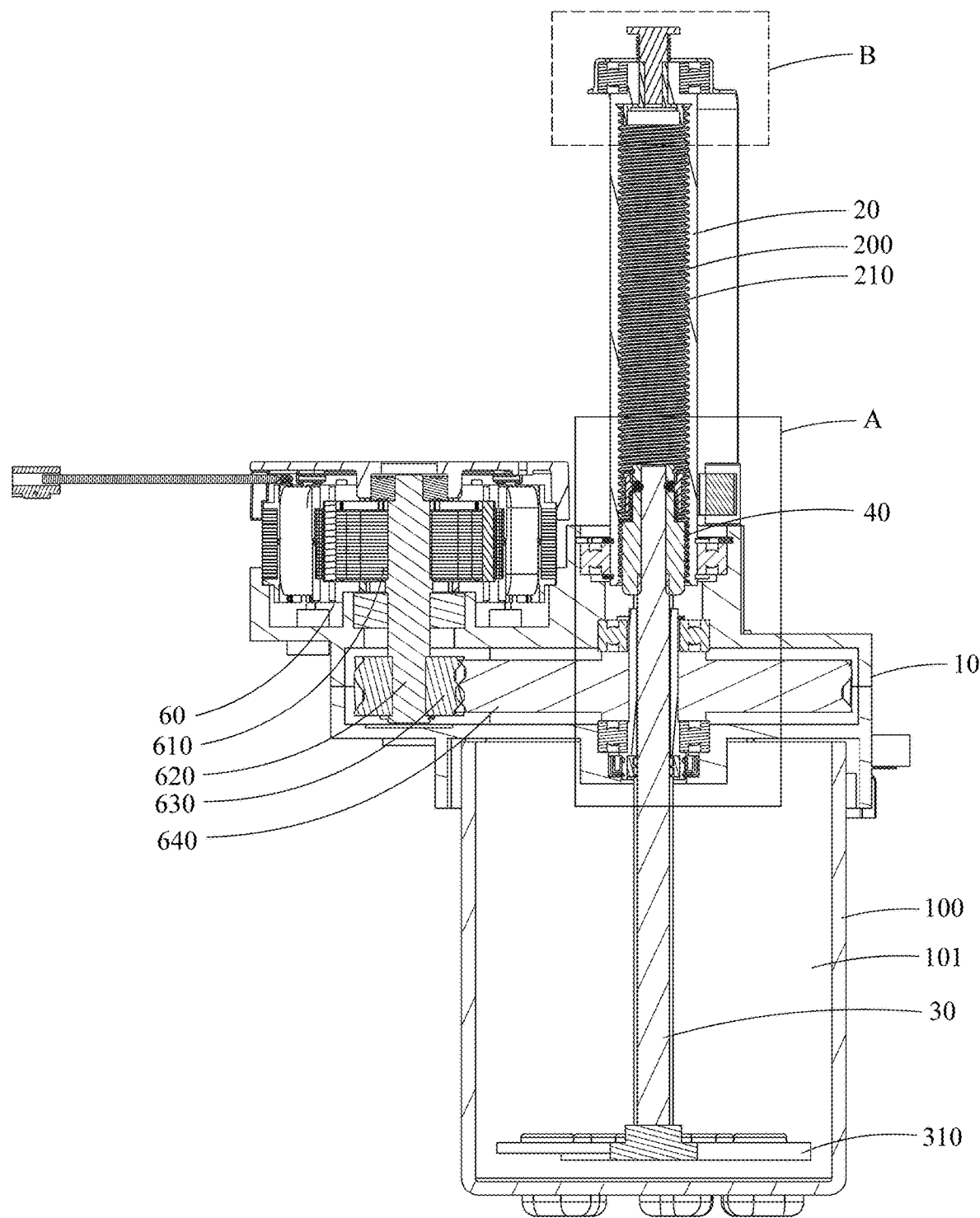
FIG. 2 is a first cross-sectional view of the present invention.

As shown in FIGS. 1 and 2, the processing bowl 100 is detachably secured to the mounting platform 10. The detachable connection may be implemented using conventional coupling structures, including but not limited to twist-lock mechanisms, threaded engagement, or magnetic attraction. The installation of the processing bowl 100 is not limited to the mounting platform 10; in alternative implementations, the processing bowl 100 may be secured to any suitable component of the food processor, provided that it remains stationary relative to the mounting platform 10 during operation.

As shown in FIG. 2, the processing bowl 100 is configured as a cup-shaped container having an open top and defining the processing chamber 101. During use, the mounting platform 10 functions as a sealing lid that closes the open top of the processing bowl 100 when the two components are connected.

In the present invention, the cutter shaft 30 is configured to move axially relative to the mounting platform 10. As depicted in FIG. 2, the axial direction of the cutter shaft 30 corresponds to the vertical direction, such that the cutter shaft 30 is capable of upward and downward motion relative to the mounting platform 10.

As shown in FIGS. 2 and 3, the internal threaded structure 210 is implemented as a threaded groove formed within the installation bore 200 of the drive sleeve 20. In a first embodiment of the external threaded structure 40, the external threaded structure 40 comprises a drive nut 410 disposed on the cutter shaft 30. The drive nut 410 is threadably engaged with the threaded groove. The cooperative engagement between the drive nut 410 and the threaded groove enables rotational transmission. When a rotational speed differential exists between the cutter shaft 30 and the drive sleeve 20, the drive nut 410 simultaneously rotates and translates relative to the drive sleeve 20, thereby driving the cutter shaft 30 to move axially relative to the drive sleeve 20.

In a second embodiment of the external threaded structure 40, the external threaded structure 40 comprises threads that are directly machined onto an outer surface of the cutter shaft 30. These machined threads are configured to engage the threaded groove formed in the installation bore 200. Compared with the first embodiment, this structure reduces manufacturing complexity and cost by eliminating the need for a separate drive nut.

Furthermore, the cutter shaft 30 is detachably connected to the drive nut 410. This detachable configuration enables disassembly of the cutter shaft 30 from the drive sleeve 20, thereby facilitating removal during operation interruptions or for subsequent maintenance and cleaning purposes.

As shown in FIG. 3, in a first embodiment of the connection between the cutter shaft 30 and the drive nut 410, the drive nut 410 defines a spline socket 400, and the cutter shaft 30 is provided with a coupling shaft 320 that is movably inserted into the spline socket 400. The drive nut 410 further comprises a quick-release mechanism 401 configured to constrain the coupling shaft 320 within the spline socket 400. The quick-release mechanism 401 serves to prevent unintentional disengagement, thereby maintaining the mechanical connection between the drive nut 410 and the cutter shaft 30.

In one example, the spline socket 400 is configured as a keyway, and the coupling shaft 320 is configured as a keyed shaft. The keyway-keyed shaft engagement ensures that the drive nut 410 and the cutter shaft 30 rotate synchronously while allowing relative axial assembly or disassembly.

In a second embodiment of the connection between the cutter shaft 30 and the drive nut 410, the two components are fastened together using a bolted connection.

In a third embodiment, the connection between the cutter shaft 30 and the drive nut 410 is established using a magnetic attraction mechanism.

Figure 4:
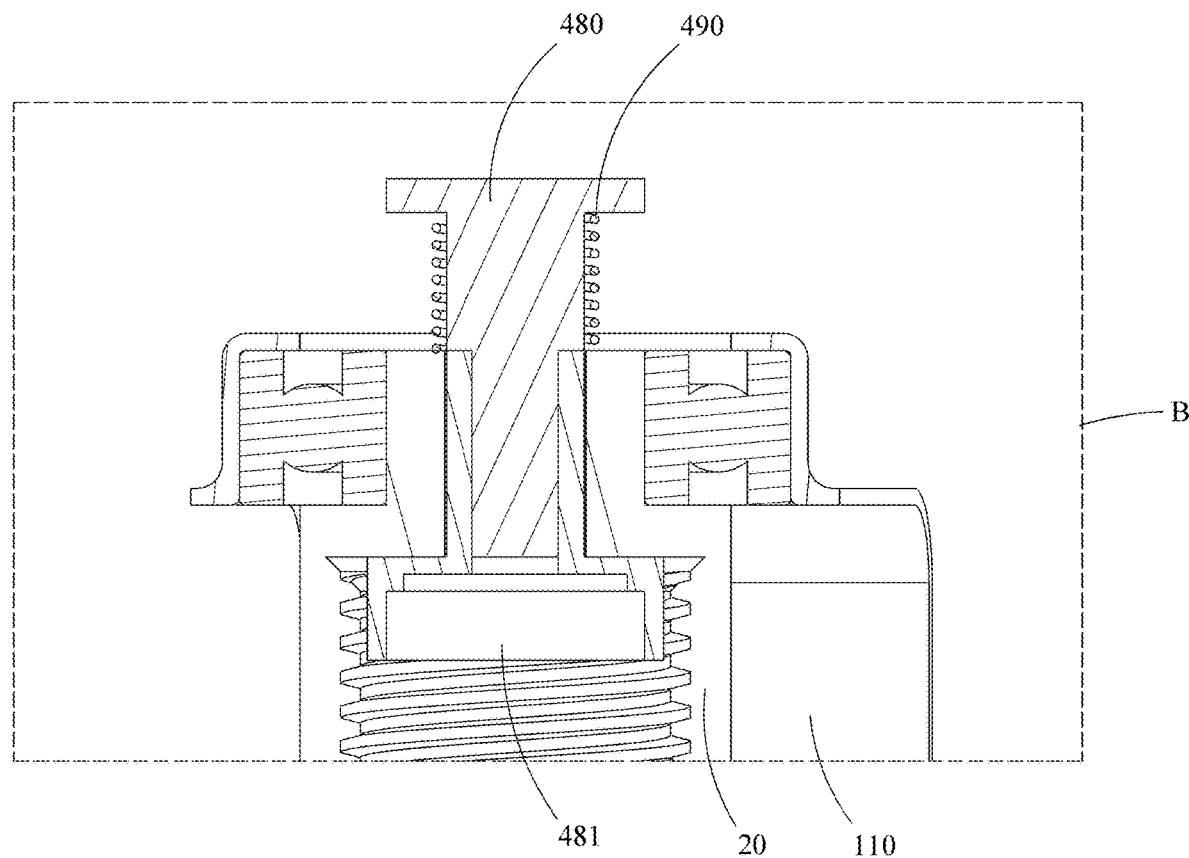
FIG. 4 is an enlarged view of part B in FIG. 2.

As shown in FIGS. 3 and 4, in a first embodiment of the quick-release mechanism 401, the coupling shaft 320 is provided with a detent groove 330, and the drive nut 410 defines a radial bore 420 that communicates with the detent groove 330. A detent ball 430 is movably disposed within the radial bore 420 and is configured to be embedded in the detent groove 330. A locking collar 440 is sleeved externally around the drive nut 410 and is arranged to move relative to the drive nut 410. The locking collar 440 is provided with a locking shoulder 450 that abuts the detent ball 430, thereby constraining the detent ball 430 within the detent groove 330 and securing the connection between the cutter shaft 30 and the drive nut 410. To disengage the cutter shaft 30 from the drive nut 410, the locking collar 440 is displaced relative to the drive nut 410 from a locked position to an unlocked position. In the unlocked position, sufficient clearance is provided for the detent ball 430 to move radially outward, enabling it to disengage from the detent groove 330. Subsequent axial movement of the cutter shaft 30 away from the drive nut 410 forces the detent ball 430 out of the detent groove 330, thereby allowing the coupling shaft 320 to be withdrawn from the spline socket 400 and completing the disassembly process.

As shown in FIG. 3, the detent ball 430 is spherical, and the detent groove 330 has a curved cross-sectional profile. This geometry facilitates the outward displacement of the detent ball 430 when the cutter shaft 30 is withdrawn from the drive nut 410, thereby enabling smooth separation.

As shown in FIGS. 3 and 4, the quick-release mechanism 401 further comprises a locking spring 460 configured to apply a biasing force to the locking collar 440. The locking spring 460 maintains the locking collar 440 in the locked position, wherein the locking shoulder 450 abuts the detent ball 430. The locking spring 460 may be implemented as a compression spring. To transition to the unlocked position, an external force is required to drive the locking collar 440 downward. In the absence of external force, the locking spring 460 restores the locking collar 440 to the locked position by spring bias.

As shown in FIG. 3, the drive nut 410 is provided with a retaining ring 470, which is configured to abut the locking collar 440 and prevent it from detaching from the drive nut 410 due to the upward force applied by the locking spring 460. The locking collar 440 is annular in shape, and in the locked position, an upper surface of the locking collar 440 abuts the retaining ring 470. To unlock, the locking collar 440 must be driven downward from the locked position to the unlocked position.

As shown in FIGS. 3 and 4, the drive sleeve 20 is movably fitted with a release actuator 480. The release actuator 480 comprises an actuator tab 481 configured to abut the locking collar 440 and push the locking collar 440 from the locked position to the unlocked position when activated.

As shown in FIG. 4, a release return spring 490 is connected between the release actuator 480 and the drive sleeve 20. The release return spring 490 biases the release actuator 480 toward an unactuated position, as illustrated in FIG. 4. To displace the locking collar 440 from the locked position to the unlocked position, the release actuator 480 is manually pressed, causing the release actuator 480 to move relative to the drive sleeve 20 and exert a pushing force on the locking collar 440. During this process, the release return spring 490 is compressed. Upon release of the release actuator 480, the stored energy in the release return spring 490 returns the release actuator 480 to its original position.

Figure 10:
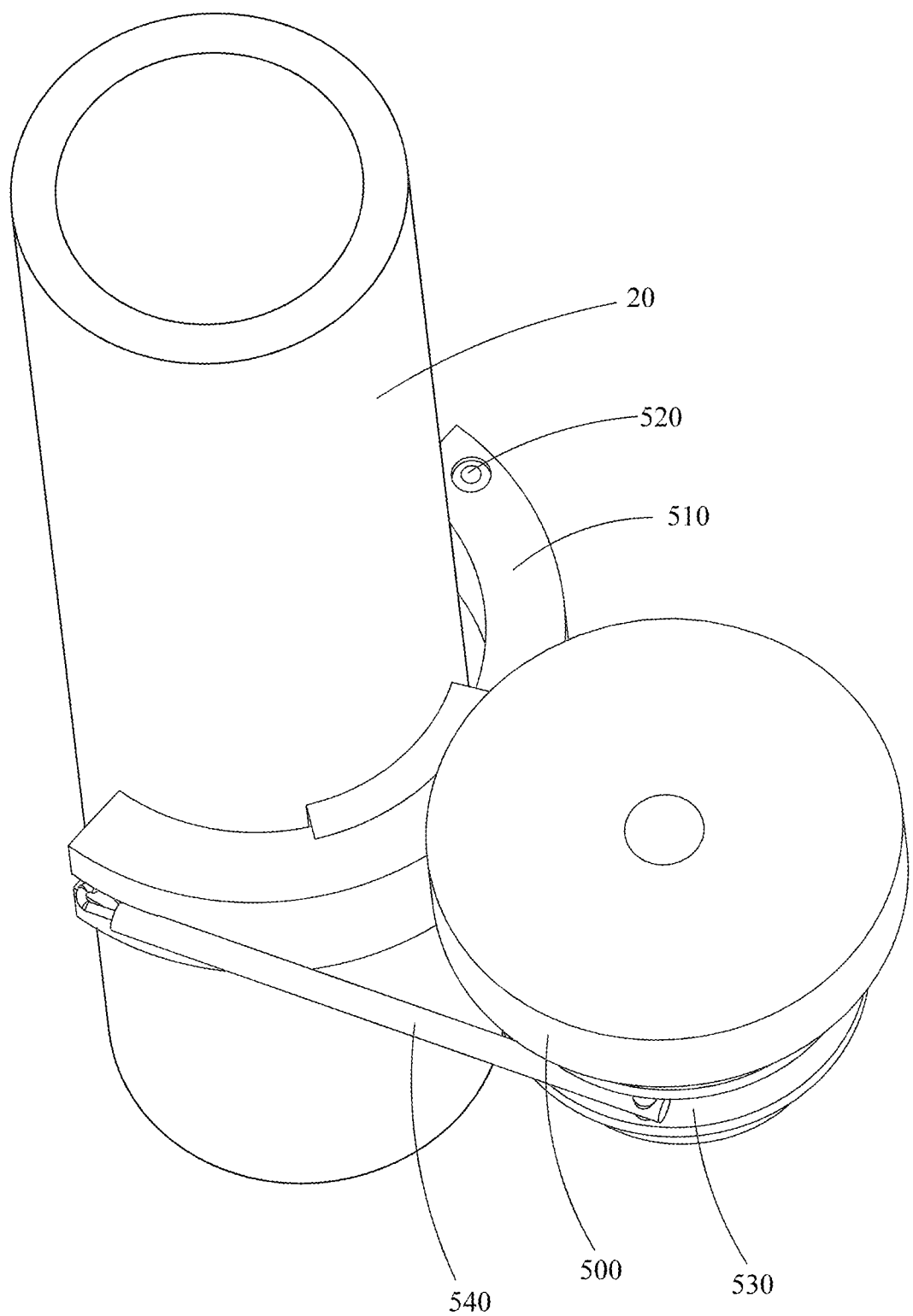
FIG. 10 is a structural view of a speed differential module.

As shown in FIGS. 1 and 10, in a first embodiment of the speed differential module 50, the speed differential module 50 comprises a brake shoe 510 and an actuation lever 500. The brake shoe 510 is rotatably or movably arranged relative to the mounting platform 10. When the brake shoe 510 rotates or translates relative to the mounting platform 10, it incrementally approaches or separates from the drive sleeve 20. The actuation lever 500 is configured to actuate the brake shoe 510 to rotate or move relative to the mounting platform 10. In this embodiment, the constraining force applied to the drive sleeve 20 is generated through frictional engagement between the drive sleeve 20 and the brake shoe 510. As the frictional force increases, the rotational speed of the drive sleeve 20 is further reduced, thereby increasing the rotational speed differential between the drive sleeve 20 and the cutter shaft 30. This, in turn, increases the axial displacement rate of the cutter shaft 30 relative to the drive sleeve 20.

The brake shoe 510 and the actuation lever 500 may be installed either on the mounting platform 10 or on other structural components of the food processor, depending on design requirements.

In one embodiment, the brake shoe 510 is rotatably mounted relative to the mounting platform 10 and is configured to rotate about a pivot shaft 520. The brake shoe 510 has a semicircular shape, which enhances surface conformity and improves frictional engagement with the drive sleeve 20.

In this rotatable configuration, the actuation lever 500 includes a control knob 530 that is pivotally connected to a link 540. The link 540 is further pivotally connected to the brake shoe 510. As the control knob 530 rotates, the link 540 transmits torque to the brake shoe 510, causing the brake shoe 510 to rotate about the pivot shaft 520. This rotational adjustment modifies the degree of contact between the brake shoe 510 and the drive sleeve 20, thereby varying the applied frictional force. The control knob 530 may be implemented as a damping knob or any other conventional rotary actuator.

Alternatively, in this rotatable configuration, the actuation lever 500 may be implemented as an electric motor configured to drive the brake shoe 510 to rotate about the pivot shaft 520. The transmission mechanism may employ gear engagement, wherein a first gear coaxially mounted on the pivot shaft 520 is engaged with a second gear mounted on the output shaft of the motor. The meshing of the first gear and second gear transmits torque from the motor to the brake shoe 510.

In one embodiment, the brake shoe 510 is linearly movable relative to the mounting platform 10. The brake shoe 510 is arranged to move along a straight path defined by the mounting platform 10. In this configuration, the actuation lever 500 is implemented as a linear motor. An extension shaft of the linear motor is fixedly connected to the brake shoe 510, thereby enabling the linear motor to drive the linear displacement of the brake shoe 510. This displacement adjusts the degree of contact between the brake shoe 510 and the drive sleeve 20, thereby varying the applied frictional force.

Figure 11:
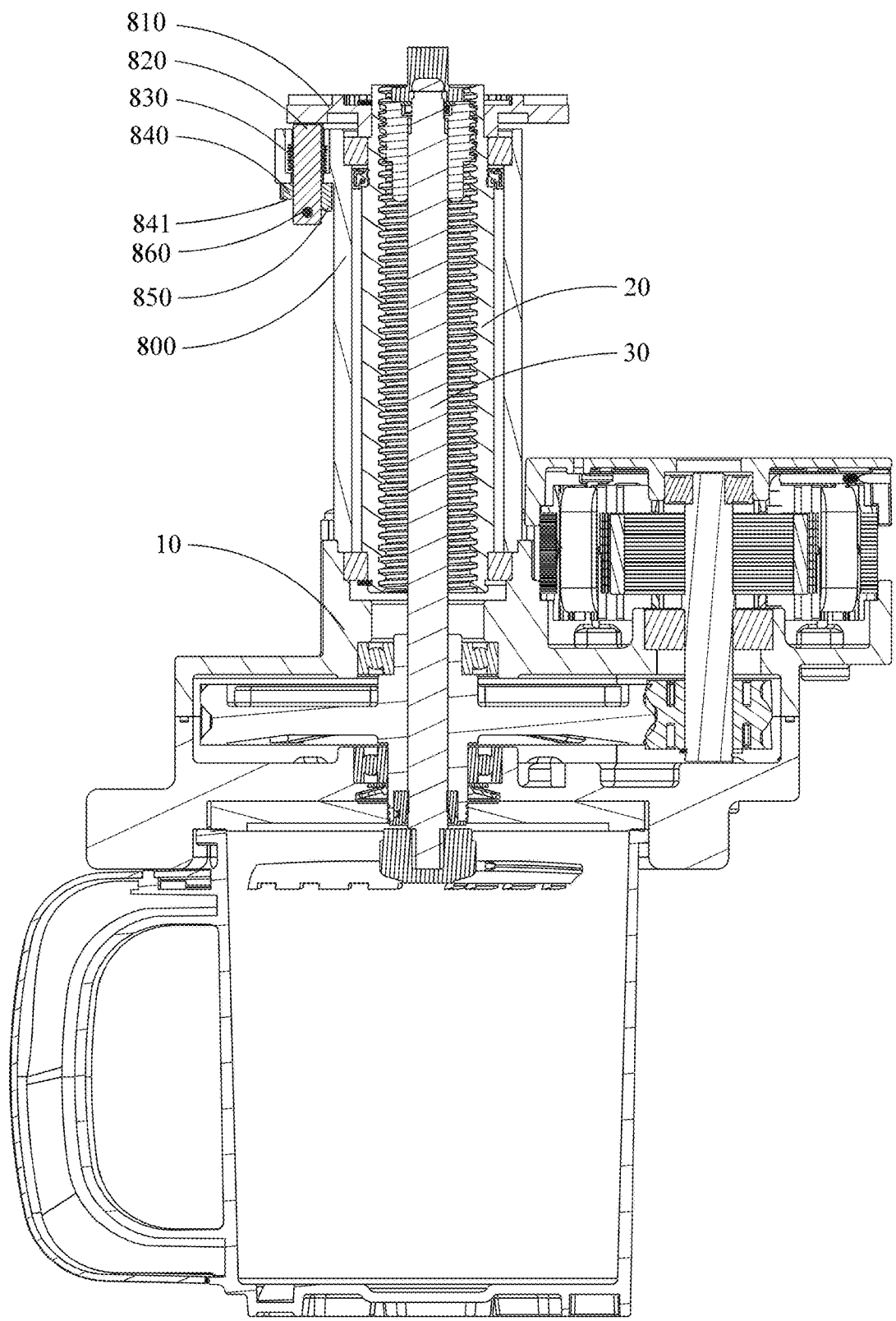
FIG. 11 is a fourth cross-sectional view of the present invention.
Figure 12:
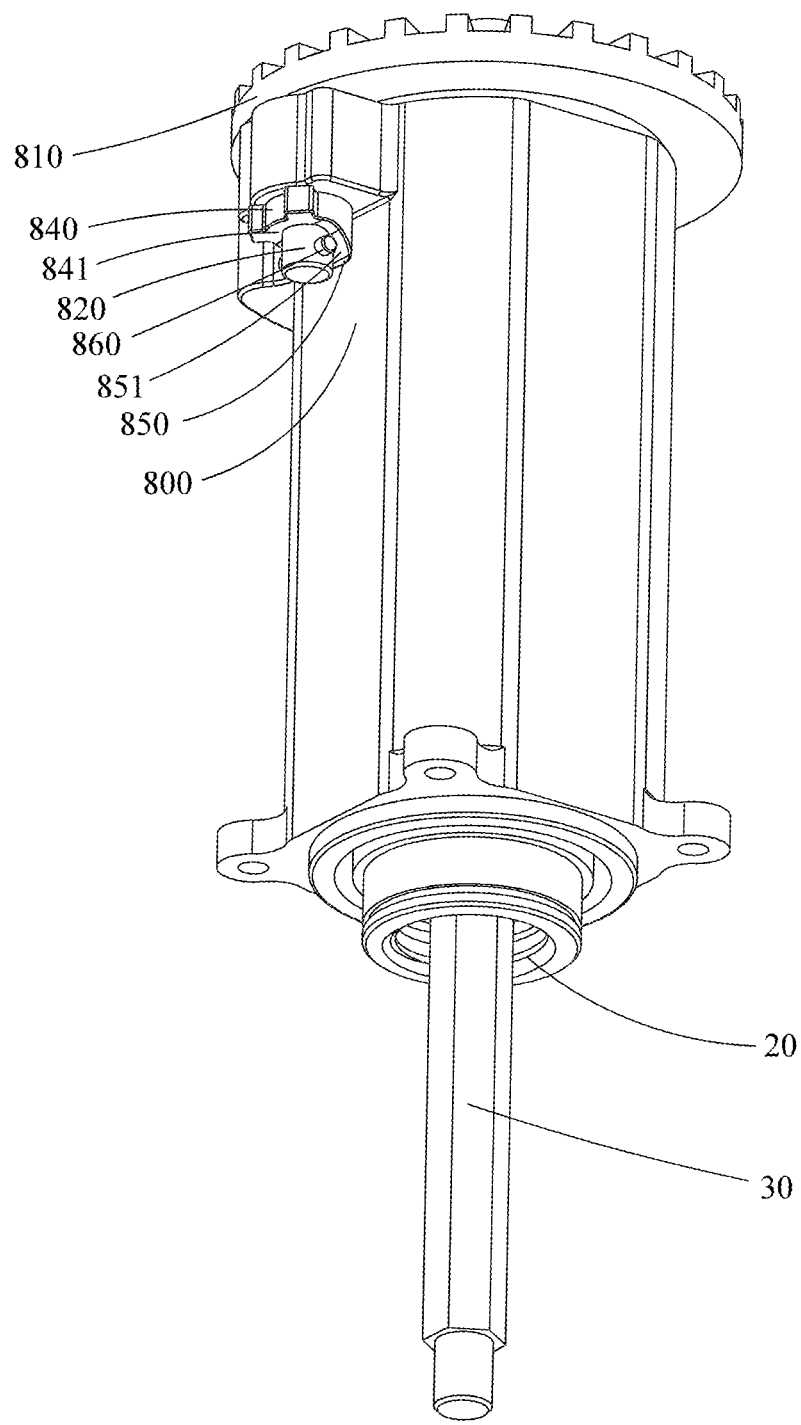
FIG. 12 is a first partial view of the present invention.
Figure 13:
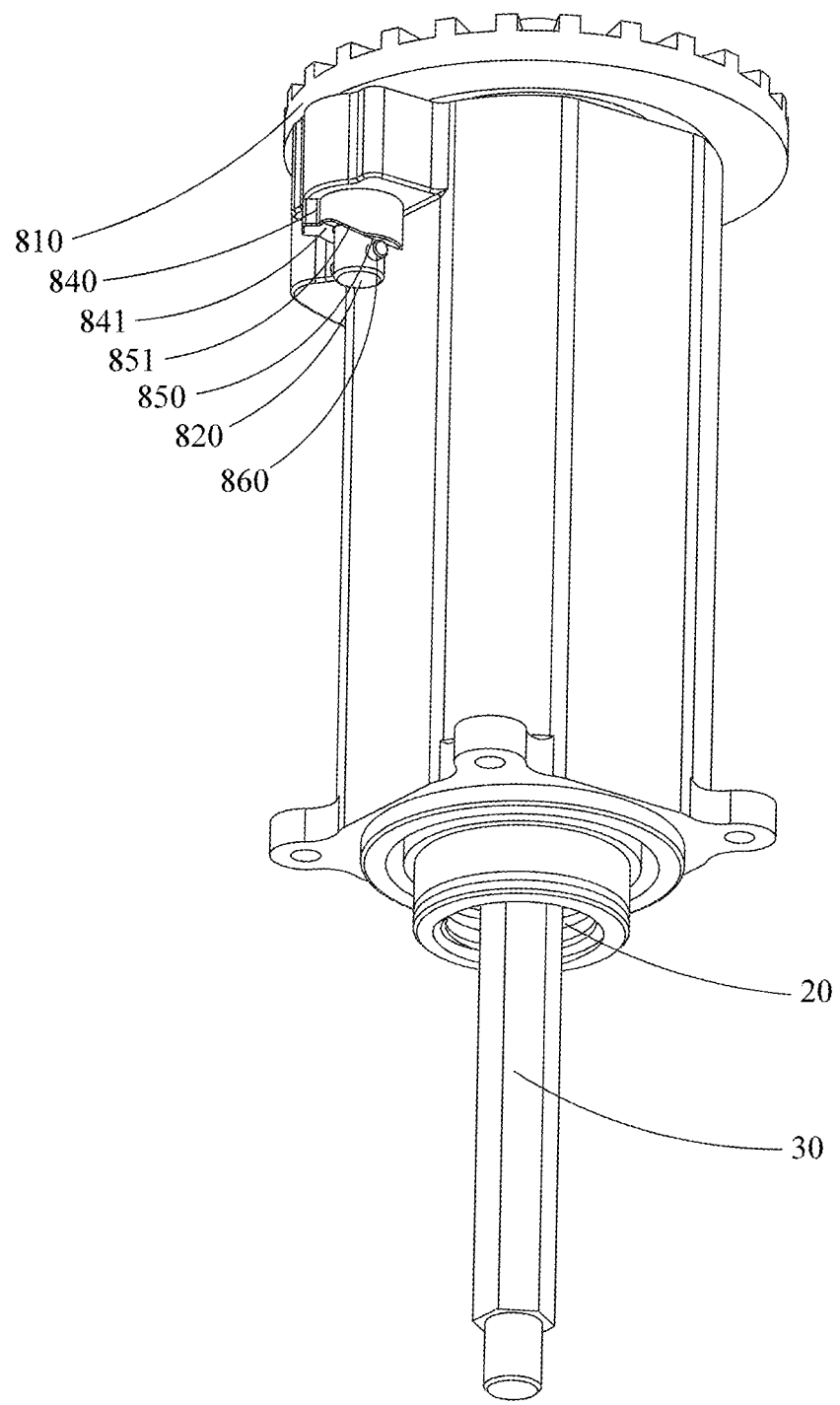
FIG. 13 is a second partial view of the present invention.

As shown in FIGS. 11 to 13, in the first embodiment of the speed differential module 50, when the brake shoe 510 is configured to move linearly relative to the mounting platform 10, the brake shoe 510 comprises a friction pad 820 that is linearly movable relative to the mounting platform 10. A friction disc 810 is provided on the drive sleeve 20. The friction pad 820 is operatively connected to a linear actuation module configured to drive the friction pad 820 to move linearly relative to the mounting platform 10 such that the friction pad 820 incrementally engages or disengages the friction disc 810.

The linear actuation module includes an elastic element 830 connected to the friction pad 820. The elastic element 830, which may be implemented as a compression spring, is configured to bias the friction pad 820 in a direction toward the friction disc 810 to establish frictional contact therewith and impart rotational resistance to the drive sleeve 20. To enable adjustable control over the frictional force between the friction pad 820 and the friction disc 810, a rotary cam adjuster 840 is rotatably mounted relative to the mounting platform 10. The rotary cam adjuster 840 comprises a cam lobe 850 extending in a direction away from the friction disc 810. A cam ramp 851 is defined between the cam lobe 850 and the rotary cam adjuster 840. The friction pad 820 is further provided with a follower arm 860 configured to selectively engage with the cam ramp 851, the cam lobe 850, or a rear contact surface 841 of the rotary cam adjuster 840 facing away from the friction disc 810. The position of the follower arm 860 against one of the foregoing surfaces creates a height differential, which defines a range of displacement of the friction pad 820 toward the friction disc 810. By varying this displacement, the resulting contact pressure and thus the frictional resistance applied to the drive sleeve 20 can be adjusted.

In certain embodiments, the linear actuation module may alternatively be implemented using an existing linear motor.

In further embodiments, a friction module mounting bracket 800 is provided on the mounting platform 10, and the linear actuation module is mounted to the friction module mounting bracket 800.

In a second embodiment of the speed differential module 50, the speed differential module 50 comprises a commercially available hysteresis brake, the output shaft of which is connected to the drive sleeve 20. The hysteresis brake operates based on magnetic hysteresis principles and generates torque by controlling an input excitation current. By varying the excitation current, the hysteresis brake regulates the rotational resistance applied to the drive sleeve 20, thereby controlling its rotational speed.

Figure 9:
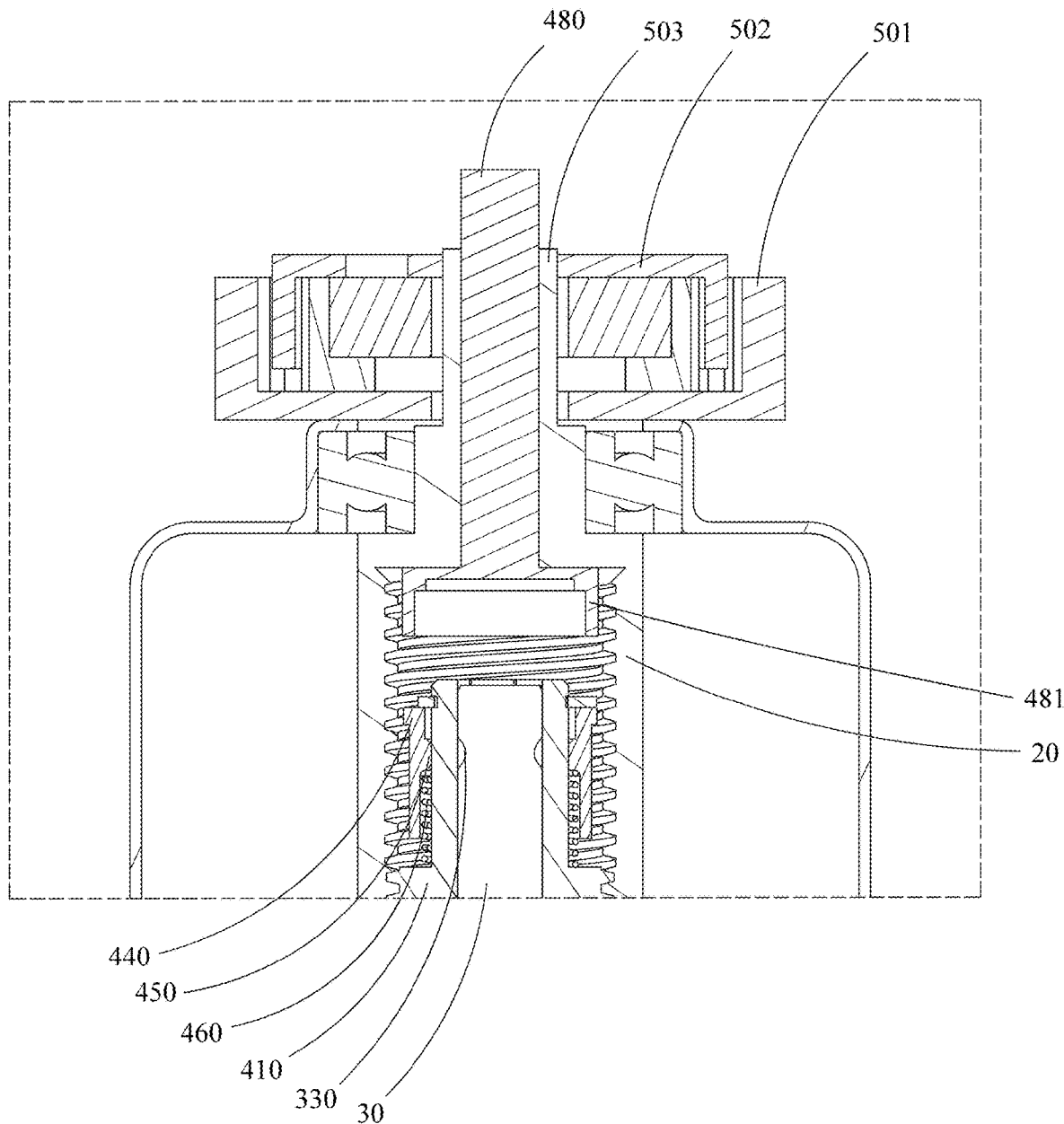
FIG. 9 is an enlarged view of part C in FIG. 8.

As shown in FIG. 9, in this embodiment, the speed differential module 50 comprises a stator magnetic pole 501 fixed within the food processor, a rotor 502 rotatably disposed within the stator magnetic pole 501, and a coil positioned within the stator magnetic pole 501. The drive sleeve 20 includes a drive coupling 503 that is fixedly connected to the rotor 502. When the coil is energized, the excitation current generates a magnetic field that produces torque on the rotor 502. Consequently, the rotational speed of the rotor 502, and thereby the rotational speed of the drive sleeve 20, can be controlled via adjustment of the excitation current.

As shown in FIG. 2, the driving module 60 comprises a motor 610, the output shaft 620 of which is connected to a drive gear 630. The drive gear 630 is in meshing engagement with a driven gear 640, which is coupled to the cutter shaft 30.

The driven gear 640 is fixed to the shaft sleeve 300. Thus, the rotation of the drive gear 630 drives the driven gear 640, which in turn rotates the shaft sleeve 300. Through this mechanism, the shaft sleeve 300 transmits torque to the cutter shaft 30, causing it to rotate.

As shown in FIG. 1, the mounting platform 10 is further provided with a sensing module 70 for detecting the axial position of the cutter shaft 30. The cutter shaft 30 is axially movable between a first position and a second position relative to the mounting platform 10. When the cutter shaft 30 reaches the second position, it actuates the sensing module 70.

Figure 5:
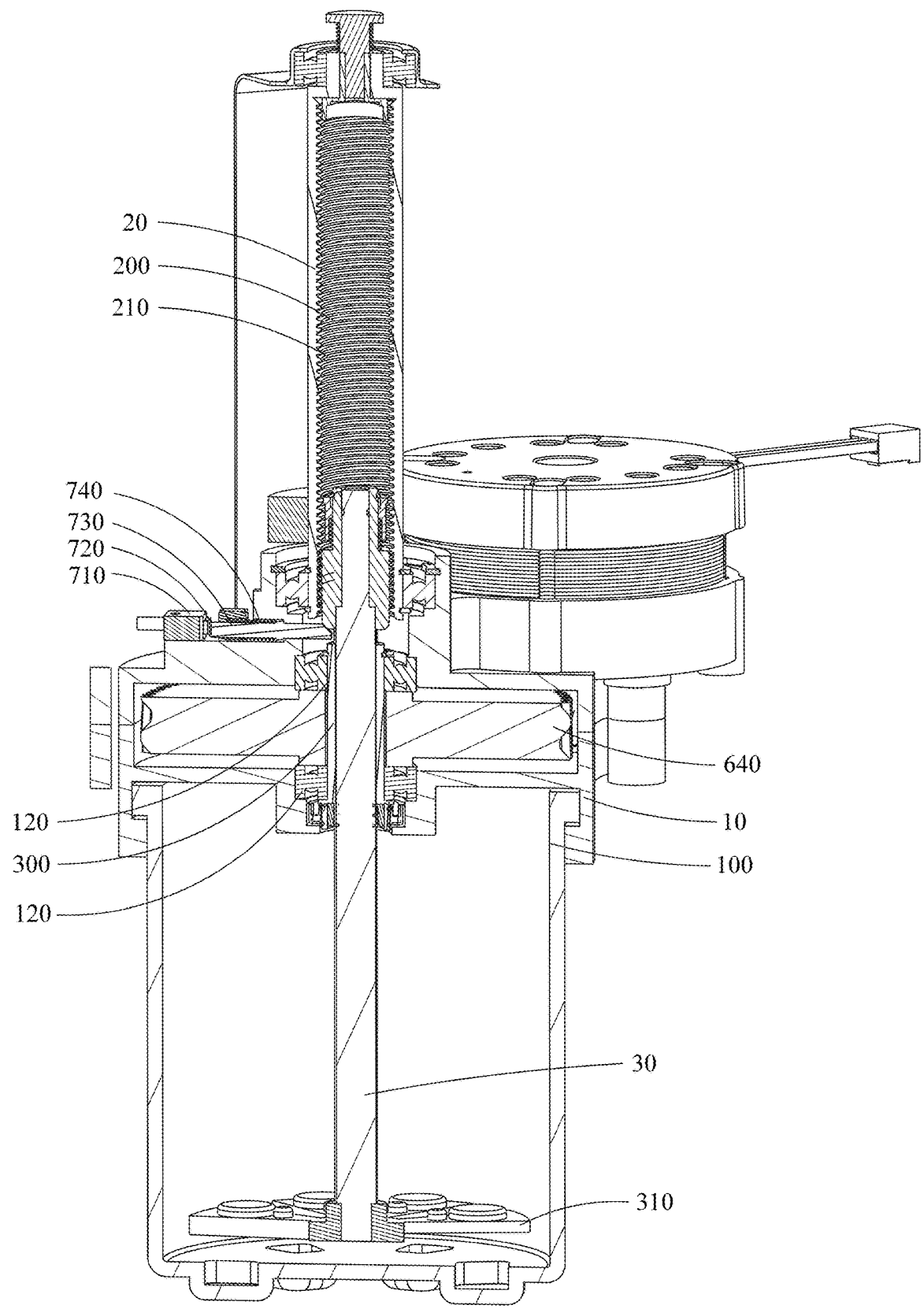
FIG. 5 is a second cross-sectional view of the present invention.
Figure 6:
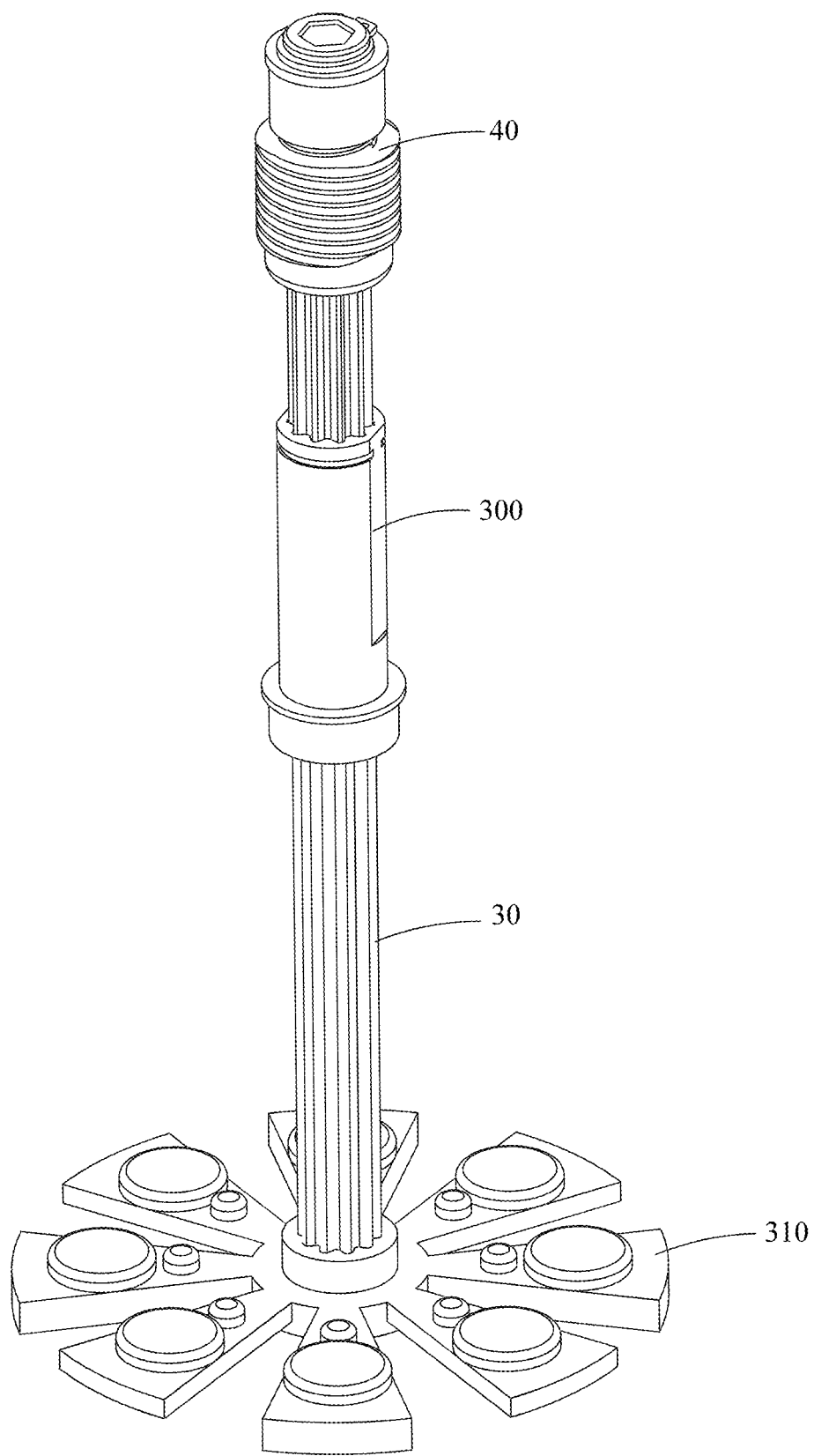
FIG. 6 is a perspective view of a cutter shaft and a cutter.
Figure 7:
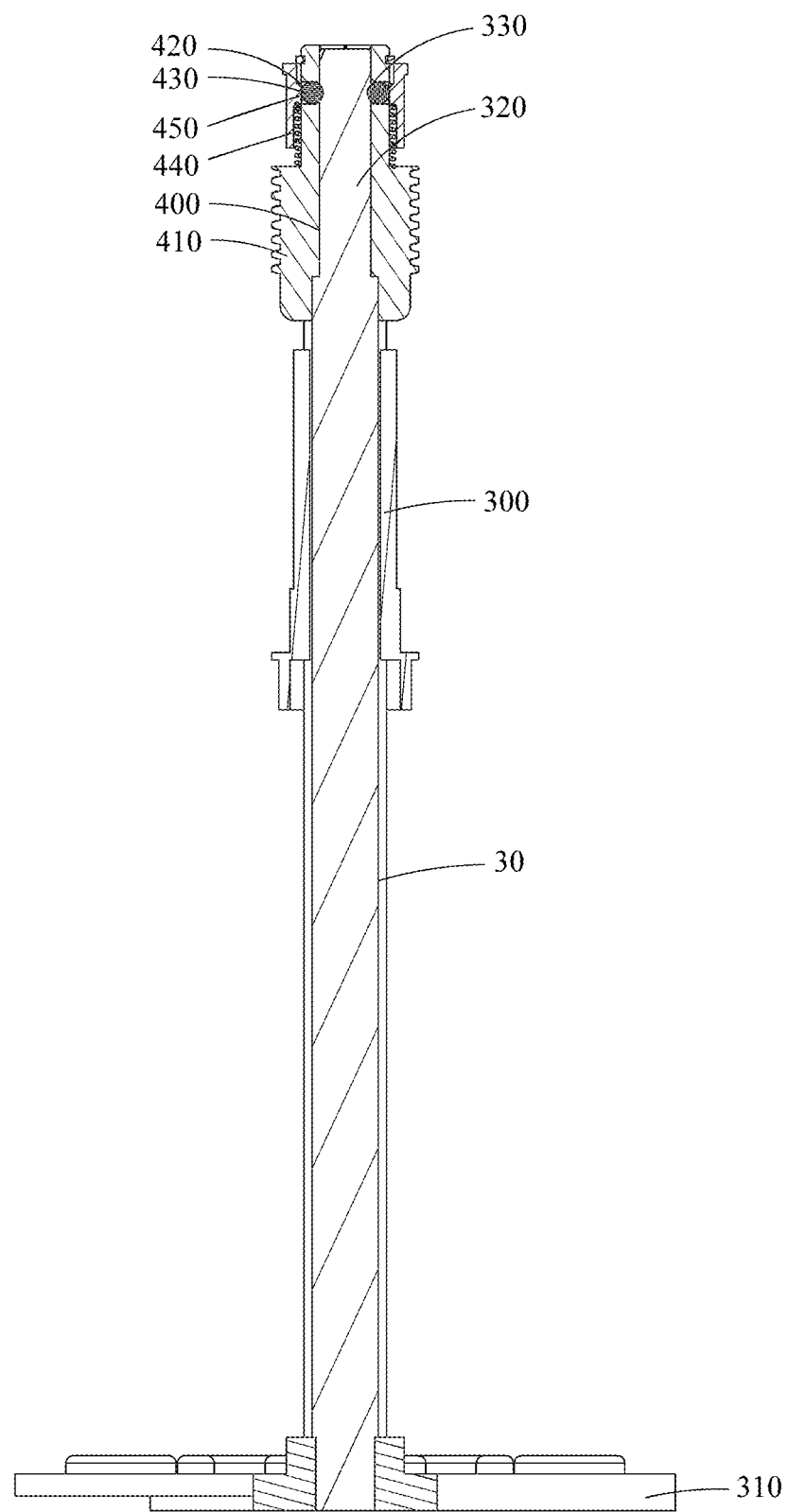
FIG. 7 is a cross-sectional view of the cutter shaft and the cutter.
Figure 8:
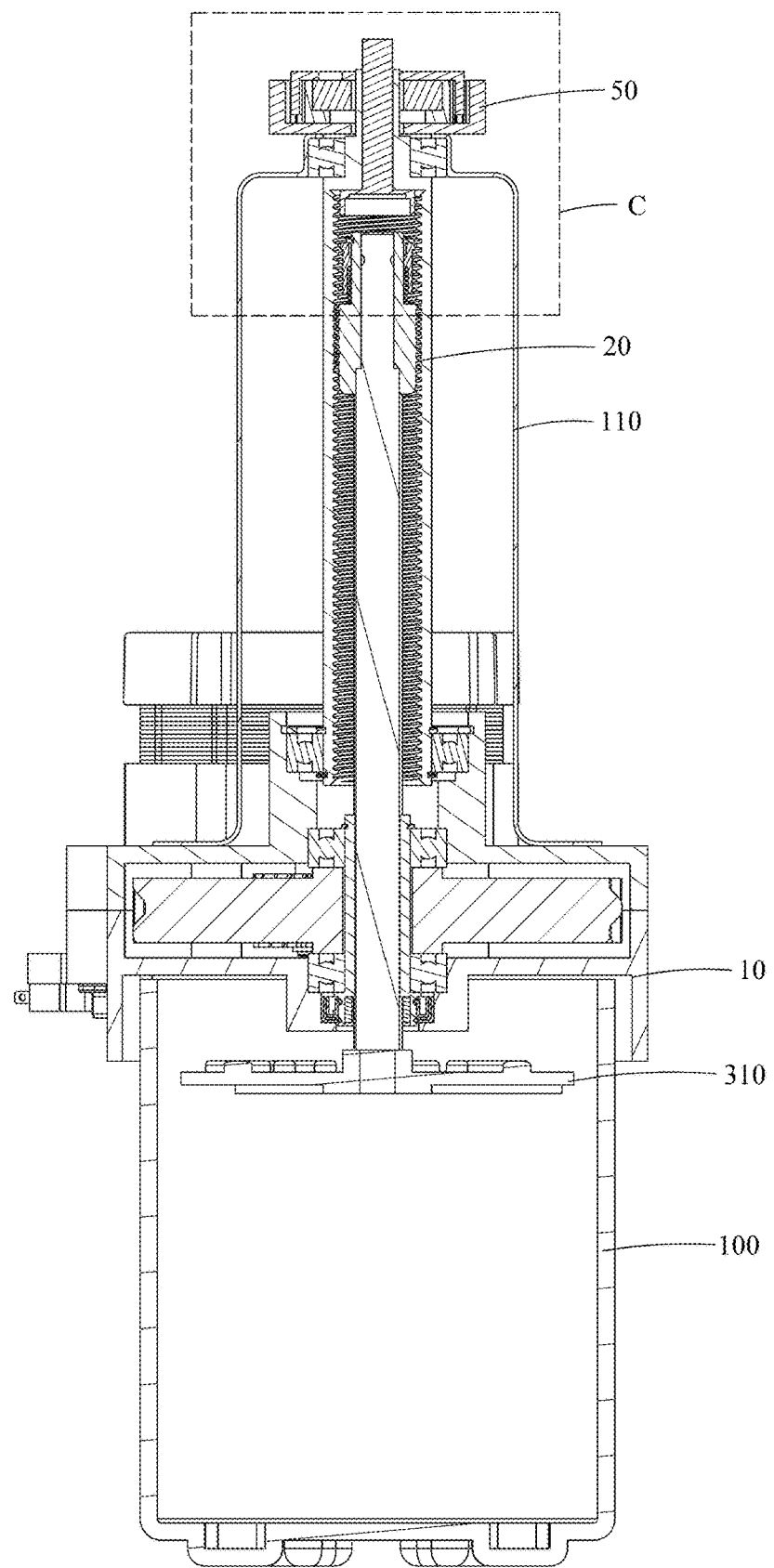
FIG. 8 is a third cross-sectional view of the present invention.

As shown in FIG. 5, the sensing module 70 comprises a microswitch 710. When the cutter shaft 30 is displaced axially to the second position, the cutter shaft 30 actuates a contact arm 720 of the microswitch 710. The microswitch 710 outputs a signal to a control board of the food processor, thereby enabling the control board to determine the axial position of the cutter shaft 30 and to control the rotational direction of the motor 610 within the driving module 60. A change in the rotational direction of the motor 610 alters the relative rotational relationship between the drive sleeve 20 and the cutter shaft 30, thus reversing the axial movement direction of the cutter shaft 30 due to the interaction of the internal and external threaded structures.

As further shown in FIG. 5, the mounting platform 10 is movably fitted with an actuator rod 730. The actuator rod 730 is configured to move reciprocally between a sensing position and a separated position. An actuator return spring 740 is disposed on the mounting platform 10 and biases the actuator rod 730 toward the separated position. When the cutter shaft 30 reaches the second position, it presses the actuator rod 730 into the sensing position, thereby actuating the contact arm 720 of the microswitch 710. When the cutter shaft 30 is no longer in contact with the actuator rod 730, the actuator return spring 740 restores the actuator rod 730 to the separated position.

The foregoing description illustrates the fundamental principles, key structural features, and technical advantages of the present invention. It should be understood by those skilled in the art that the embodiments described above are not intended to limit the present invention. The specification and the associated figures are provided solely to explain the principles of the invention. Modifications and improvements may be made without departing from the spirit or scope of the invention, and all such variants shall fall within the scope of protection defined by the appended claims and their legal equivalents.

What is claimed is:

1. A lifting mechanism for a food processor, comprising:
   a mounting platform;
   a cutter shaft rotatably mounted relative to the mounting platform and axially movable along an axis of the cutter shaft relative to the mounting platform;
   a drive sleeve defining an installation bore, the installation bore comprising an internal threaded structure, the cutter shaft being provided with an external threaded structure, the internal threaded structure being threadably engaged with the external threaded structure; and
   a driving module operatively coupled to the cutter shaft and configured to drive the cutter shaft to rotate relative to the mounting platform;
   wherein, when a rotational speed differential exists between the drive sleeve and the cutter shaft, the external threaded structure cooperates with the internal threaded structure to drive the cutter shaft to move along its axial direction.

2. The lifting mechanism for a food processor of claim 1, wherein the drive sleeve is rotatably mounted relative to the mounting platform, and further comprising a speed differential module configured to apply a constraining force to the drive sleeve such that a rotational speed differential exists between the drive sleeve and the cutter shaft.

3. The lifting mechanism for a food processor of claim 1, wherein the drive sleeve is fixedly mounted to the mounting platform.

4. The lifting mechanism for a food processor of claim 1, wherein the internal threaded structure is a threaded groove formed within the installation bore, and the external threaded structure comprises a drive nut disposed on the cutter shaft and threadably engaged with the threaded groove.

5. The lifting mechanism for a food processor of claim 4, wherein the cutter shaft is detachably connected to the drive nut.

6. The lifting mechanism for a food processor of claim 5, wherein the drive nut defines a spline socket, the cutter shaft comprises a coupling shaft movably inserted into the spline socket, and the drive nut comprises a quick-release mechanism configured to constrain the coupling shaft within the spline socket.

7. The lifting mechanism for a food processor of claim 6, wherein the quick-release mechanism comprises a detent groove formed on the coupling shaft, a radial bore defined in the drive nut in communication with the detent groove, and a detent ball movably disposed in the radial bore and configured to be embedded in the detent groove;

wherein a locking collar is sleeved around an outer surface of the drive nut and is movably arranged relative to the drive nut, the locking collar comprising a locking shoulder; and wherein the locking shoulder abuts the detent ball to constrain the detent ball within the detent groove.

8. The lifting mechanism for a food processor of claim 7, wherein the quick-release mechanism further comprises a locking spring configured to apply a force to the locking collar to maintain the locking collar in a locked position in which the locking shoulder abuts the detent ball, and wherein the drive sleeve is movably provided with a release actuator comprising an actuator tab configured to abut the locking collar and push the locking collar from the locked position to an unlocked position.

9. The lifting mechanism for a food processor of claim 2, wherein the speed differential module comprises a stator magnetic pole fixedly arranged within the food processor, a rotor rotatably arranged within the stator magnetic pole, a coil disposed inside the stator magnetic pole, and a drive coupling provided on the drive sleeve and fixedly connected to the rotor.

10. The lifting mechanism for a food processor of claim 2, wherein the speed differential module comprises a brake shoe and an actuation lever, the brake shoe being rotatably or movably arranged relative to the mounting platform and configured, upon rotation or movement relative to the mounting platform, to incrementally engage or disengage from the drive sleeve, and the actuation lever being configured to actuate the brake shoe to rotate or move relative to the mounting platform.

* * * * *